US012409765B2

(12) United States Patent
Kondo et al.

(10) Patent No.: US 12,409,765 B2
(45) Date of Patent: Sep. 9, 2025

(54) LOCKING DEVICE FOR SEAT BACK TABLE

(71) Applicant: TOYOTA BOSHOKU KABUSHIKI KAISHA, Aichi-ken (JP)

(72) Inventors: Shuhei Kondo, Miyoshi (JP); Naoki Muramatsu, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 91 days.

(21) Appl. No.: 18/403,180

(22) Filed: Jan. 3, 2024

(65) Prior Publication Data
US 2024/0239255 A1 Jul. 18, 2024

(30) Foreign Application Priority Data

Jan. 13, 2023 (JP) .................................. 2023-003621

(51) Int. Cl.
*B60N 3/00* (2006.01)
*B64D 11/06* (2006.01)

(52) U.S. Cl.
CPC .......... *B60N 3/004* (2013.01); *B64D 11/0638* (2014.12)

(58) Field of Classification Search
CPC .......... B60N 3/00; B60N 3/001; B60N 3/002; B60N 3/004; B64D 11/00; B64D 11/0638
USPC ....................................................... 292/118
See application file for complete search history.

(56) References Cited

U.S. PATENT DOCUMENTS

| 5,143,337 | A  | * | 9/1992  | Tomayko, Jr. | ......... | B60N 3/002 |
|           |    |   |         |              |           | 248/240.4  |
| 8,770,635 | B2 | * | 7/2014  | Schwickerath | ......... | E05C 3/042 |
|           |    |   |         |              |           | 292/DIG. 31 |
| 9,126,688 | B2 | * | 9/2015  | Philipzik    | ................ | B60N 3/004 |
| 11,186,372 | B2 | * | 11/2021 | Drenzeck     | ........... | B64D 11/0636 |
| 11,485,292 | B2 | * | 11/2022 | Vanderpool   | ............ | B60N 3/001 |
| 2005/0040681 | A1 | * | 2/2005 | Goldman     | ............. | B64D 11/064 |
|           |    |   |         |              |           | 297/145   |
| 2006/0075934 | A1 | * | 4/2006 | Ram         | .................. | B64D 11/0015 |
|           |    |   |         |              |           | 108/44    |
| 2007/0216202 | A1 | * | 9/2007 | Dickinson   | .............. | B60N 3/004 |
|           |    |   |         |              |           | 297/163   |

(Continued)

OTHER PUBLICATIONS

JP-2020172215-A, Kondo Shuhei (Year: 2020).*
EP-3922556-A1; Stienen Phillipp (Year: 2021).*

*Primary Examiner* — Nathan Cumar
(74) *Attorney, Agent, or Firm* — Greenblum & Bernstein, P.L.C.

(57) ABSTRACT

A locking device for a seat back table for locking a seat back table stored at a storage position at which the seat back table is stored along a back portion of a seat back, the locking device includes a rotary operation member provided on a main body member that is one of the seat back table and the seat back, a first locking member provided on the main body member and connected to the operation member, and a second locking member provided on the main body member and connected to the operation member or the first locking member. When the operation member is rotated in one direction from a predetermined position, the first locking member and the second locking member are rotated in directions opposite to each other and are engaged with a counterpart member that is the other of the seat back table and the seat back.

7 Claims, 8 Drawing Sheets

(56) References Cited

U.S. PATENT DOCUMENTS

| | | | |
|---|---|---|---|
| 2011/0155024 A1* | 6/2011 | McCaffrey | B60N 3/004 |
| | | | 108/26 |
| 2014/0311388 A1* | 10/2014 | Korpi | A47B 23/043 |
| | | | 108/162 |
| 2015/0321760 A1* | 11/2015 | Alford | B64C 1/1484 |
| | | | 224/482 |
| 2016/0039349 A1* | 2/2016 | Casagrande | G06F 1/166 |
| | | | 156/227 |
| 2017/0021931 A1* | 1/2017 | Stephens | B64D 11/0638 |
| 2019/0283881 A1* | 9/2019 | Colletti | B64D 11/0638 |
| 2019/0308538 A1* | 10/2019 | Buchanan | B60N 3/004 |
| 2020/0148081 A1* | 5/2020 | Marais | B64D 11/00152 |
| 2020/0172250 A1* | 6/2020 | Drenzeck | B64D 11/0636 |
| 2022/0081117 A1* | 3/2022 | Alam | B64D 11/0642 |

* cited by examiner

LOCKING DEVICE FOR SEAT BACK TABLE

This application is based on and claims priority under 35 USC 119 from Japanese Patent Application No. 2023-003621 filed on Jan. 13, 2023, the contents of which are incorporated herein by reference.

TECHNICAL FIELD

The present disclosure relates to a locking device for a seat back table. More specifically, the present disclosure relates to a locking device for a seat back table that locks a seat back table at a storage position at which the seat back table is stored along a back portion of the seat back.

BACKGROUND ART

U.S. Pat. No. 11,186,372B discloses a locking device that locks a seat back table for a rear seat passenger in a state of being stored along a back portion of a seat back. Specifically, after storing the seat back table, a user locks the seat back table in the stored state with the locking device by rotating a latch provided at a central upper portion of the seat back table and hooking the seat back table on the seat back.

The locking device further includes a pair of left and right locking claws for hooking and locking the seat back table at two positions of the seat back table in a left-right direction to the seat back in conjunction with the rotation of the latch. By being locked by the latch and the locking claws, the seat back table is held in a state of being appropriately hooked on the seat back.

In the configuration disclosed in U.S. Pat. No. 11,186,372B, a mechanism in which the locking claws are operated in conjunction with the movement of the latch includes a large number of components for converting rotational motion into linear motion by using a plurality of spring components and wires, which is complicated. Therefore, the present disclosure provides a locking device for a seat back table that can be simplified in structure.

SUMMARY

As a solution for solving the above matters, a locking device for a seat back table according to the present disclosure has the following solution.

According to a first aspect of the present disclosure, a locking device for a seat back table for locking a seat back table stored at a storage position at which the seat back table is stored along a back portion of a seat back, the locking device includes a rotary operation member configured to be provided on a main body member that is one of the seat back table and the seat back, a first locking member configured to be provided on the main body member and connected to the operation member via a connection structure in which a first pin is slidable in a first long hole to be pushed and rotated in conjunction with rotation of the operation member, and a second locking member configured to be provided on the main body member and connected to the operation member or the first locking member via a connection structure in which a second pin is slidable in a second long hole to be pushed and rotated in a direction opposite to the first locking member by the rotation of the operation member. When the operation member is rotated in one direction from a predetermined position, the first locking member and the second locking member are rotated in directions opposite to each other and are engaged with a counterpart member that is the other of the seat back table and the seat back to hold the seat back table at the storage position.

According to the first aspect of the present disclosure, a configuration in which the first locking member and the second locking member are caused to perform the locking operation as the operation member is rotated can be implemented by a simple configuration in which the first locking member and the second locking member are connected to each other via the connection structures (the first pin and the first long hole, and the second pin and the second long hole) in which the pins are slidable in the long holes. The seat back table can be appropriately locked at the storage position by the engagement of the first locking member and the second locking member with the counterpart member.

According to a second aspect of the present disclosure, the operation member is a latch configured to be engaged with the counterpart member by the rotation in the one direction to hold the seat back table at the storage position.

According to the second aspect of the present disclosure, the seat back table can also be locked at the storage position by the operation member in addition to the first locking member and the second locking member. Accordingly, the seat back table can be locked at the storage position more appropriately.

According to a third aspect of the present disclosure, when the operation member rotated in the other direction from an engagement position with the counterpart member, the first locking member and the second locking member are disengaged from the counterpart member before the operation member is disengaged from the counterpart member.

According to the third aspect of the present disclosure, when the operation member is disengaged from the counterpart member by rotating the operation member in a releasing direction, the first locking member and the second locking member can be disengaged from the counterpart member. Therefore, it is possible to prevent an unexpected situation in which the seat back table is still locked at the storage position even when the user performs an operation of disengaging the operation member from the counterpart member.

According to a fourth aspect of the present disclosure, the main body member is the seat back, the counterpart member is the seat back table, and the operation member includes a recessed hook on which a small article can be hooked on an upper surface of the hook.

According to the fourth aspect of the present disclosure, the operation member can be used as a hooking tool such as a coat hook not only when the seat back table is stored but also when the seat back table is deployed.

According to a fifth aspect of the present disclosure, the first locking member and the second locking member each include a locking claw configured to be engaged with the seat back table by entering a locking hole formed in an upper surface of the seat back table flipped to the storage position.

According to the fifth aspect of the present disclosure, the locking claws of the first locking member and the second locking member can be engaged with the seat back table without being exposed to the outside.

According to a sixth aspect of the present disclosure, the operation member is provided at a position corresponding to an intermediate portion in a width direction of the seat back table flipped to the storage position. The first locking member and the second locking member are provided with a first rotation shaft and a second rotation shaft, respectively, that are rotation centers of the first locking member and the second locking member and are separated into a position on one side and a position on the other side in the width direction sandwiching an operation rotation shaft that is a rotation center of the operation member. The second locking member is connected to the first locking member at a position between the operation rotation shaft and the second rotation shaft.

According to the sixth aspect of the present disclosure, it is possible to prevent the members from being disposed in a bulky manner in a disposition region of the operation member as compared with a case in which the second locking member is connected to the operation member together with the first locking member. As a result, it is possible to appropriately provide the locking device for a seat back table even when a back rest surface of the seat back is recessed and a disposition space is narrow, such as when the operation member is disposed at a center of the seat back in the width direction.

According to a seventh aspect of the present disclosure, the operation member is provided at a position corresponding to an intermediate portion in a width direction of the seat back table flipped to the storage position. The first locking member and the second locking member are provided with a first rotation shaft and a second rotation shaft, respectively, that are rotation centers of the first locking member and the second locking member and are separated into a position on one side and a position on the other side in the width direction sandwiching an operation rotation shaft that is a rotation center of the operation member. The operation member is rotated such that the first locking member and the second locking member are disengaged from the counterpart member regardless of a direction in which the operation member is rotated from a locked position at which the first locking member and the second locking member are engaged with the counterpart member.

According to the seventh aspect of the present disclosure, the first locking member and the second locking member can be disengaged from the counterpart member regardless of the direction in which the operation member is rotated from the locked position. Therefore, convenience of the locking device for a seat back table can be further improved.

DESCRIPTION OF EMBODIMENTS

Figure 1:
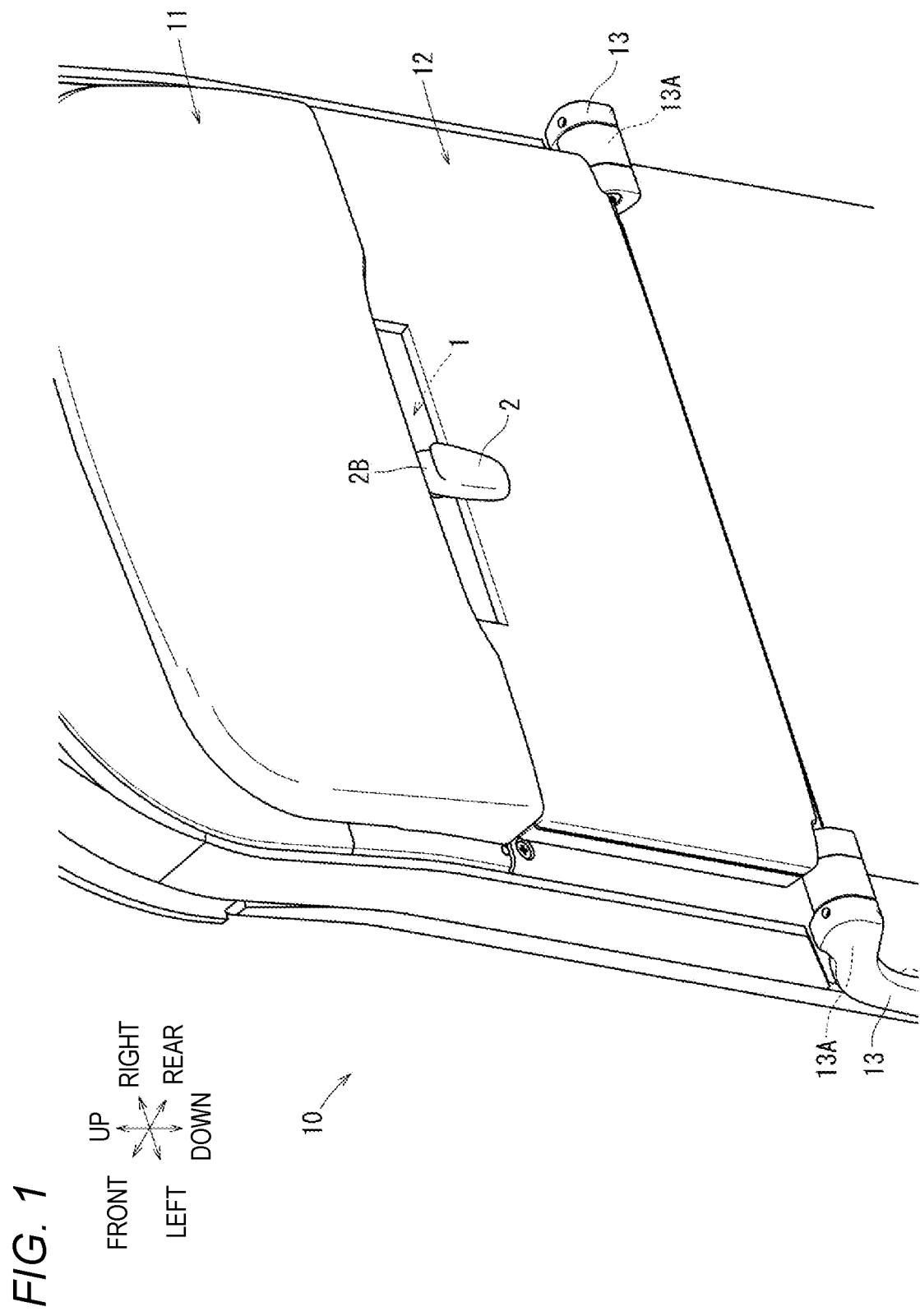
FIG. 1 is a perspective view illustrating a schematic configuration of a locking device for a seat back table according to a first embodiment.

Hereinafter, embodiments according to the present disclosure will be described with reference to the drawings.

First Embodiment

Schematic Configuration of Locking Device 1 for Seat Back Table

First, a configuration of a locking device 1 for a seat back table (hereinafter, referred to as a locking device) according to a first embodiment of the present disclosure will be described with reference to FIGS. 1 to 7. In the following description, when a specific reference diagram is not illustrated or when there is no corresponding reference numeral in the reference diagram, any one of FIGS. 1 to 7 is referred to as appropriate.

Figure 2:
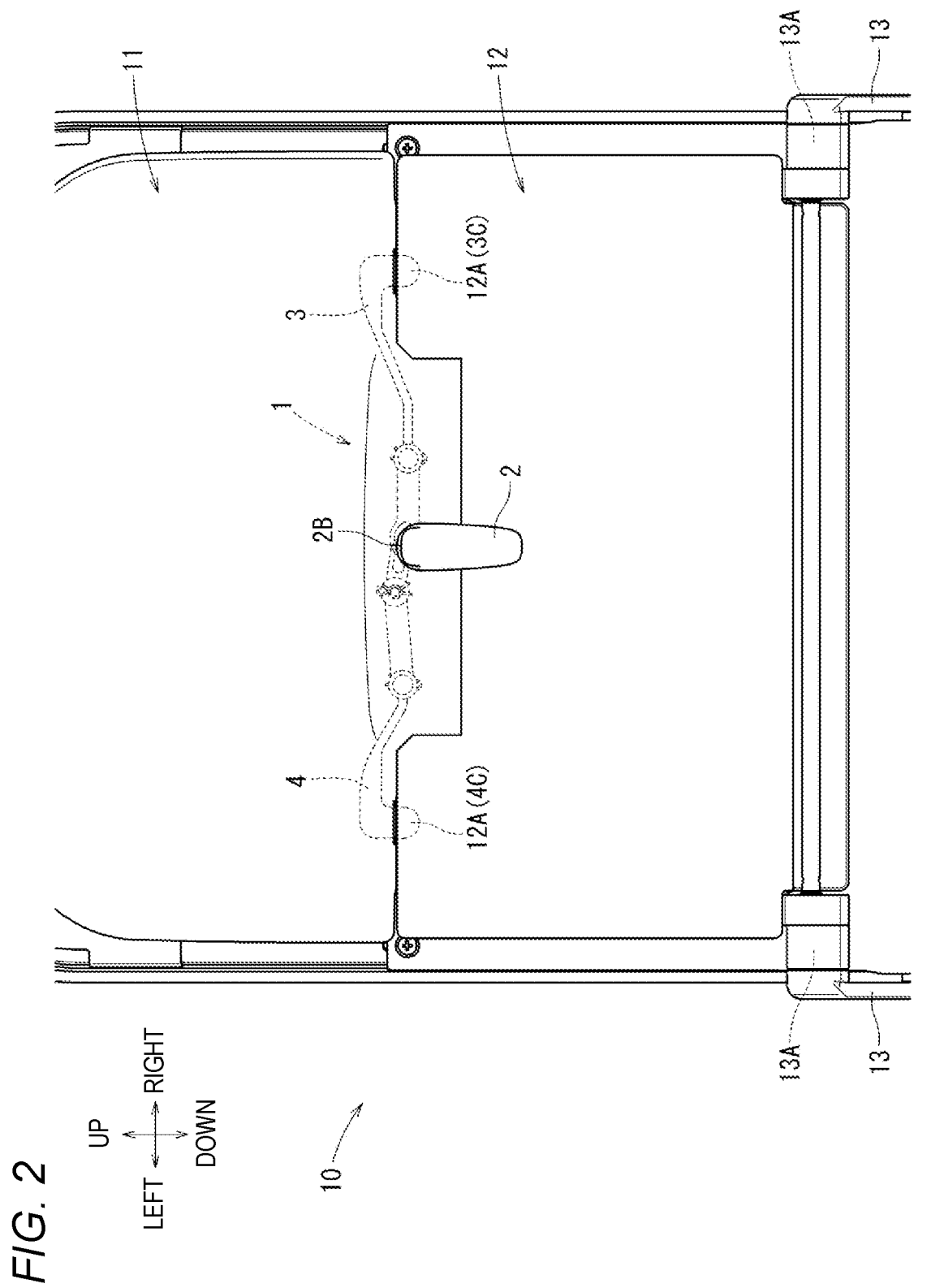
FIG. 2 is a rear view of FIG. 1.

As illustrated in FIGS. 1 and 2, the locking device 1 according to the present embodiment is applied to a seat back 11 of a seat 10 mounted on an aircraft. Specifically, the locking device 1 is used for locking a seat back table 12 that is a table for a rear seat passenger provided at a back portion of the seat back 11 at a storage position at which the seat back table 12 is stored along the back portion of the seat back 11. Here, the seat back 11 corresponds to a "main body member" according to the present disclosure. Further, the seat back table 12 corresponds to a "counterpart member" according to the present disclosure.

The seat 10 includes the seat back 11 serving as a back rest portion of a seated passenger and a seat cushion (not illustrated) serving as a seat. The seat back 11 has a so-called high back type configuration in which a head rest serving as a head rest portion is integrally formed on an upper portion of the seat back 11.

The seat back table 12 is implemented by a horizontally long flat plate-shaped tray. Lower end portions of the seat back table 12 on both left and right sides in the drawing are connected to reclining hinge centers (not illustrated) of the seat back 11 via a pair of left and right arms 13 to be rotatable coaxially with the reclining hinge centers. Accordingly, the seat back table 12 can be tilted rearward from the back portion of the seat back 11 and can be flipped forward along the back portion of the seat back 11 as the arms 13 rotate.

The seat back table 12 is connected to the arms 13 to be rotatable about table rotation shafts 13A each extending in a seat width direction (a left-right direction). Accordingly, the seat back table 12 can be further tilted rearward about the table rotation shafts 13A with respect to the arms 13 from a state of being tilted rearward from the back portion of the seat back 11 by the rearward rotation of the arms 13, and can be deployed to a use position at which the seat back table 12 is in a horizontal posture.

The seat back table 12 is flipped forward by a user from the use position to be stored in a state of overlapping along the back portion of the seat back 11. After the seat back table 12 is stored, the user switches an operation member 2 located in a central upper portion of the seat back 11 from a horizontal orientation to a vertical orientation, and three parts of the seat back table 12 in the seat width direction are locked by the locking device 1 including the operation member 2.

Figure 3:
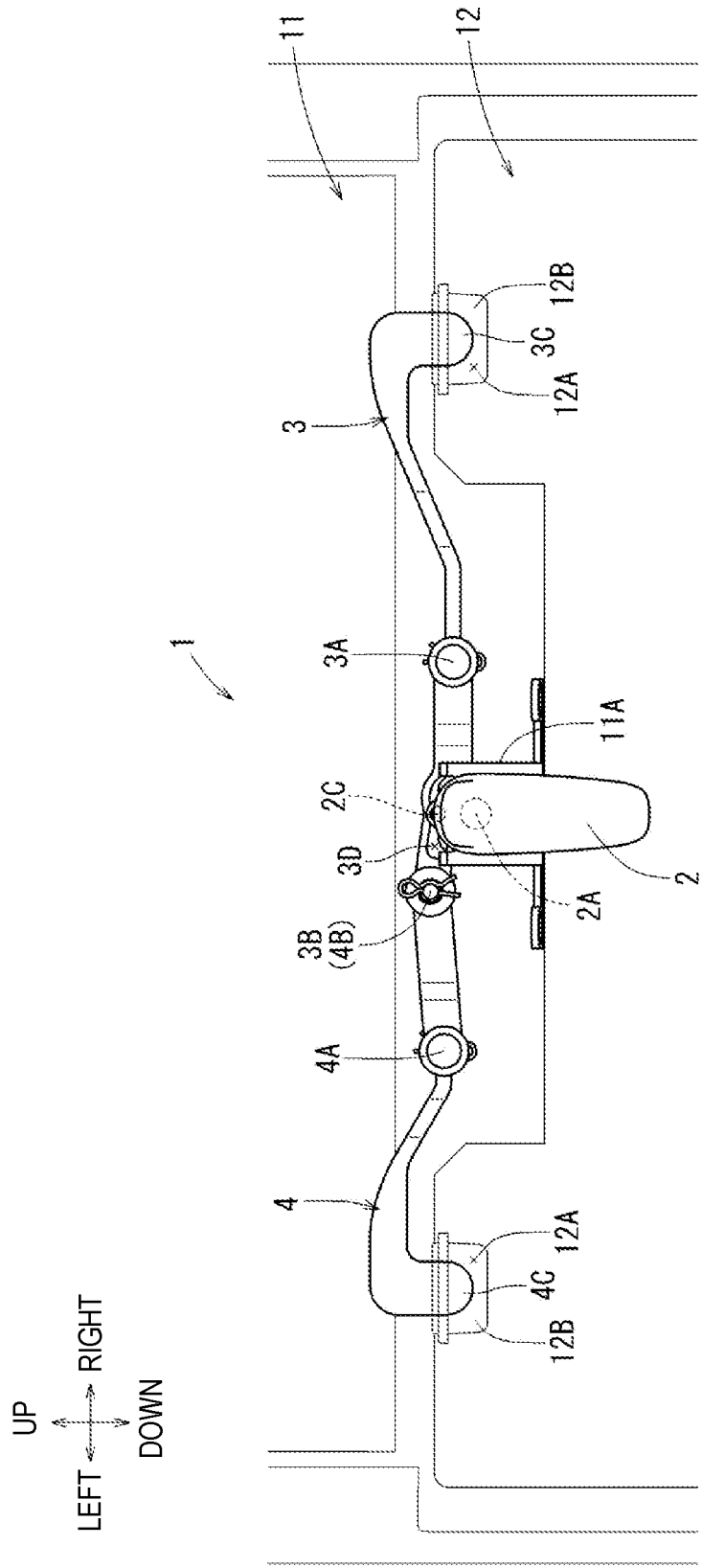
FIG. 3 is a schematic view illustrating a configuration of the locking device for a seat back table.

Specifically, as illustrated in FIGS. 2 and 3, the seat back table 12 is held not to fall rearward by a central upper part of the seat back table 12 being pressed from behind by the operation member 2 when the operation member 2 is switched to the vertical orientation. Further, the seat back table 12 is held not to fall rearward by locking claws 3C and 4C entering locking holes 12A formed in two upper surface parts of the seat back table 12 in the left-right direction by a first locking member 3 and a second locking member 4 that are interlocked with an operation of the operation member 2.

As a result, the three parts of the seat back table 12 in the seat width direction are locked by the locking device 1 including the operation member 2. One of the parts is locked by a latch in which the operation member 2 is engaged with and locks the seat back table 12 from behind. Accordingly, even when a collision load biased to either a left side or a right side of the seat back 11 is applied to the seat back table 12 from behind, the seat back table 12 is firmly locked without a problem in which a part of the seat back table 12 falls rearward from the seat back 11 due to bounce.

Member Components of Locking Device 1 for Seat Back Table

Figure 4:
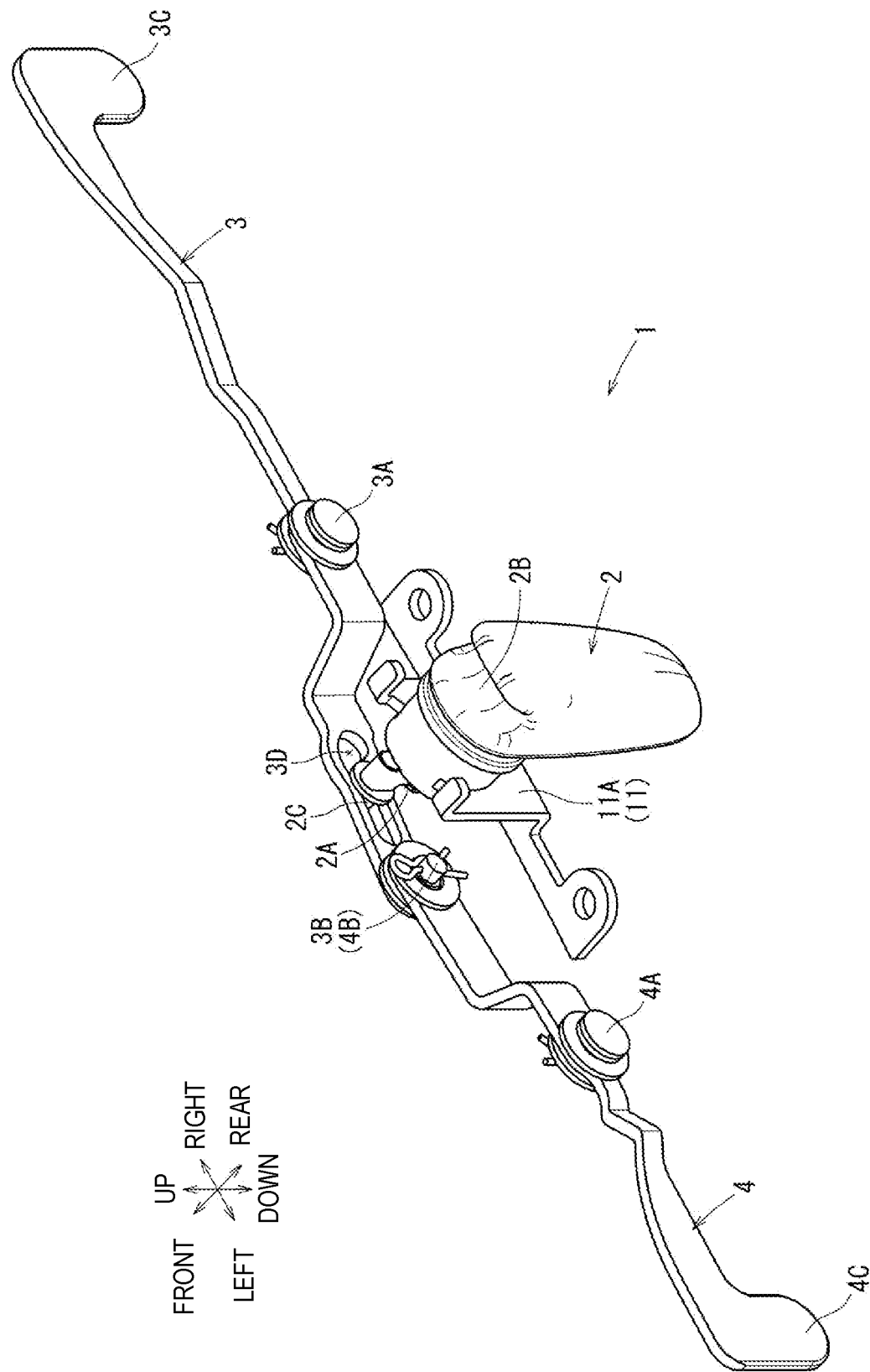
FIG. 4 is a perspective view of the locking device for a seat back table.

Hereinafter, a specific configuration of each member of the locking device 1 will be described in detail. As illustrated in FIGS. 3 and 4, the locking device 1 is provided in a state of being embedded in the back portion of the seat back 11 except for the operation member 2. The locking device 1 includes the operation member 2, the first locking member 3, and the second locking member 4. The operation member 2 is implemented as a rod-shaped knob as a whole.

Specifically, the operation member 2 is formed by a rod-shaped member extending in a tapered shape from a base end of the operation member 2 on an upper side in the drawing toward a distal end of the operation member 2 on a lower side in the drawing. An operation rotation shaft 2A extending from a front surface central portion of the base end of the operation member 2 is rotatably connected to a frame (not illustrated) provided in the back portion of the seat back 11. Accordingly, with respect to the seat back 11, the operation member 2 can be switched between a vertical orientation posture in which the distal end of the operation member 2 on the lower side in the drawing is directed downward and a horizontal orientation posture in which the operation member 2 is directed in the left-right direction by rotating about the operation rotation shaft 2A.

The operation member 2 is in a state in which the vicinity of the operation rotation shaft 2A is supported from the lower side, the left side, and the right side in the drawing by a bracket 11A fixed to the frame (not illustrated) provided in the back portion of the seat back 11. A recessed hook 2B penetrating in the left-right direction in the drawing is formed in an upper surface portion of the operation member 2 which is a surface on the upper side in the drawing. The hook 2B functions as a so-called coat hook on which a rear seat passenger can hook a coat.

That is, as illustrated in FIG. 1, after storing the seat back table 12, the operation member 2 is switched to the vertical orientation to lock the seat back table 12, thereby setting the hook 2B to be recessed downward. Therefore, the rear seat passenger can hook a coat on the hook 2B recessed downward.

Even when the seat back table 12 is folded rearward, the hook 2B can be used as the coat hook by switching the operation member 2 to the vertical orientation. The hook 2B may also be used for hooking a small article in addition to hooking the coat.

Figure 5:
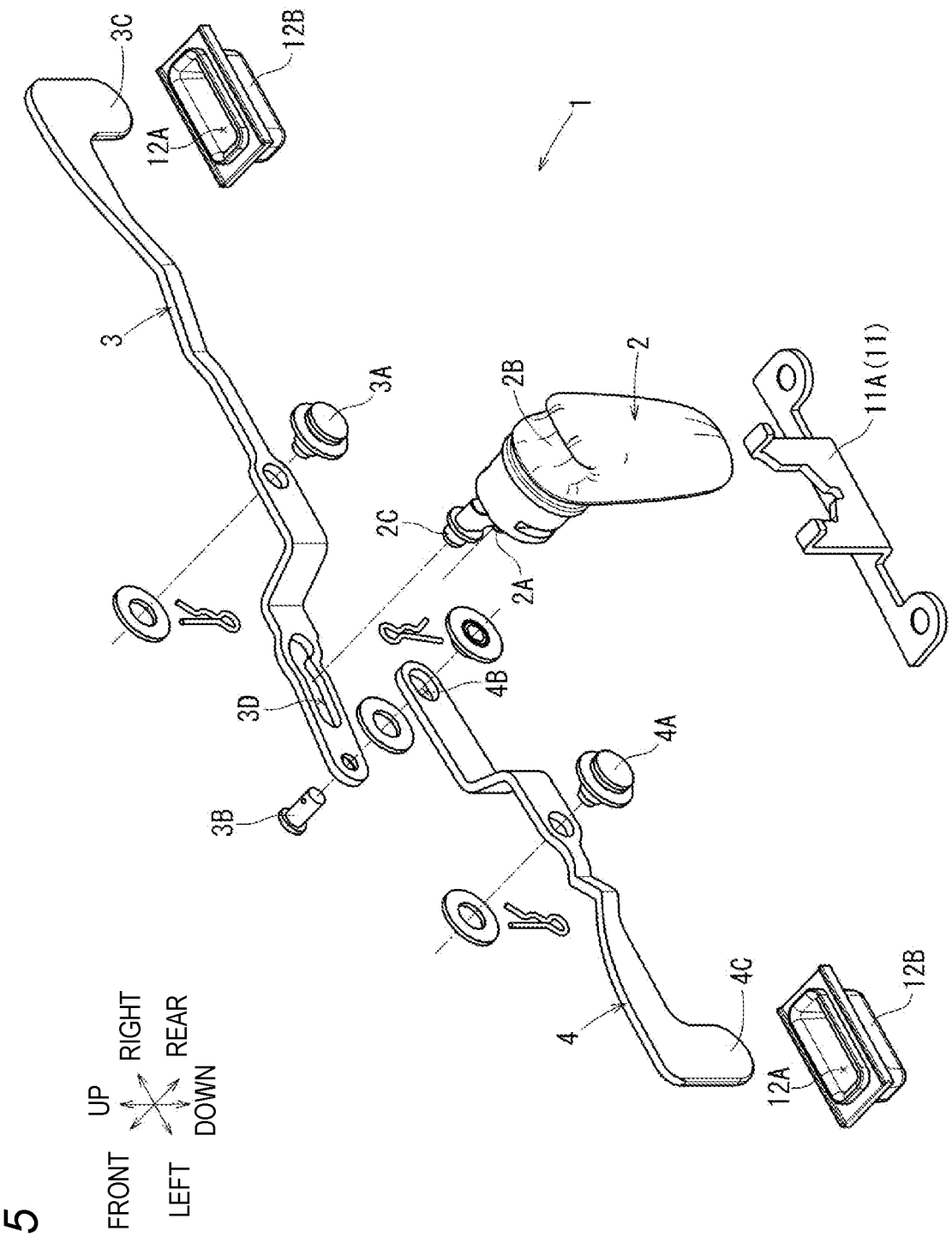
FIG. 5 is an exploded perspective view of the locking device for a seat back table.

As illustrated in FIGS. 3 to 5, each of the first locking member 3 and the second locking member 4 is formed by a single metal plate elongated in the left-right direction in the drawing. The first locking member 3 and the second locking member 4 are disposed in the back portion of the seat back 11 with plate surfaces of the first locking member 3 and the second locking member 4 oriented in a front-rear direction. An intermediate portion of the first locking member 3 in the left-right direction in the drawing, which is a longitudinal direction of the first locking member 3, is rotatably connected to the frame (not illustrated) provided in the back portion of the seat back 11 by a first rotation shaft 3A having an axis directed in the front-rear direction.

Similarly, an intermediate portion of the second locking member 4 in the left-right direction in the drawing, which is a longitudinal direction of the second locking member 4, is rotatably connected to the frame (not illustrated) provided in the back portion of the seat back 11 by a second rotation shaft 4A having an axis directed in the front-rear direction. The first rotation shaft 3A is located on a right side in the drawing relative to the operation rotation shaft 2A which is a rotation center of the operation member 2. Further, the second rotation shaft 4A is located on a left side in the drawing relative to the operation rotation shaft 2A.

A second pin 3B having an axis directed in the front-rear direction passes through a left end of the first locking member 3 in the drawing, and the first locking member 3 is connected to a right end of the second locking member 4 in the drawing via the second pin 3B. The first locking member 3 is formed with the locking claw 3C extending downward at a right end of the first locking member 3 in the drawing. A first long hole 3D extending in the left-right direction in the drawing, which is a longitudinal direction of the first long hole 3D, is formed in an intermediate portion of the first locking member 3 between a portion at the left end in the drawing through which the second pin 3B passes and a portion through which the first rotation shaft 3A passes.

A first pin 2C extending forward from the operation member 2 passes through the first long hole 3D from behind. The first pin 2C extends forward from a position deviated upward in the drawing relative to the operation rotation shaft 2A, which is the rotation center of the operation member 2. The first pin 2C pushes the first locking member 3 in an up-down direction in the drawing while moving inside the first long hole 3D in the left-right direction in the drawing according to a rotation direction of the operation member 2 as the operation member 2 is rotated. Accordingly, the first locking member 3 rotates about the first rotation shaft 3A according to a pushing direction thereof.

Figure 6:
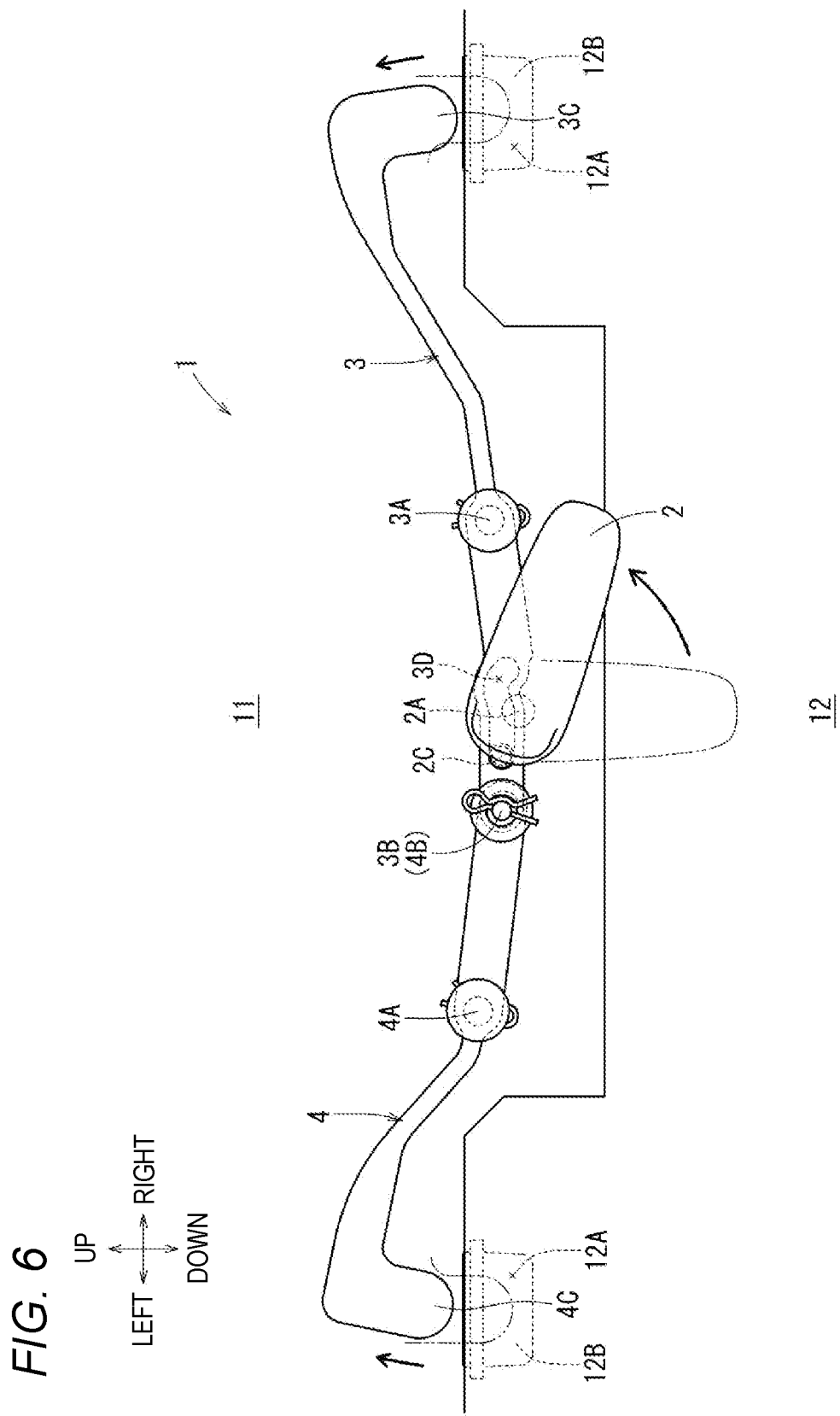
FIG. 6 is a schematic view illustrating a state in which an operation member is rotated rightward from a locked position.

Specifically, as illustrated in FIG. 6, when the operation member 2 is rotated counterclockwise to be swung to the right side in the drawing from a vertical orientation state, the first long hole 3D of the first locking member 3 is pushed downward in the drawing by the first pin 2C of the operation member 2. Accordingly, the first locking member 3 is rotated counterclockwise in the drawing about the first rotation shaft 3A. Due to this rotation, the first locking member 3 operates to pull up the locking claw 3C at the right end thereof in the drawing.

When the operation member 2 is returned from the state of being swung to the right side in the drawing shown in FIG. 6 to the vertical orientation state, the first locking member 3 is rotated clockwise in the drawing opposite to the above. Accordingly, the first locking member 3 operates to push down the locking claw 3C at the right end thereof in the drawing.

Figure 7:
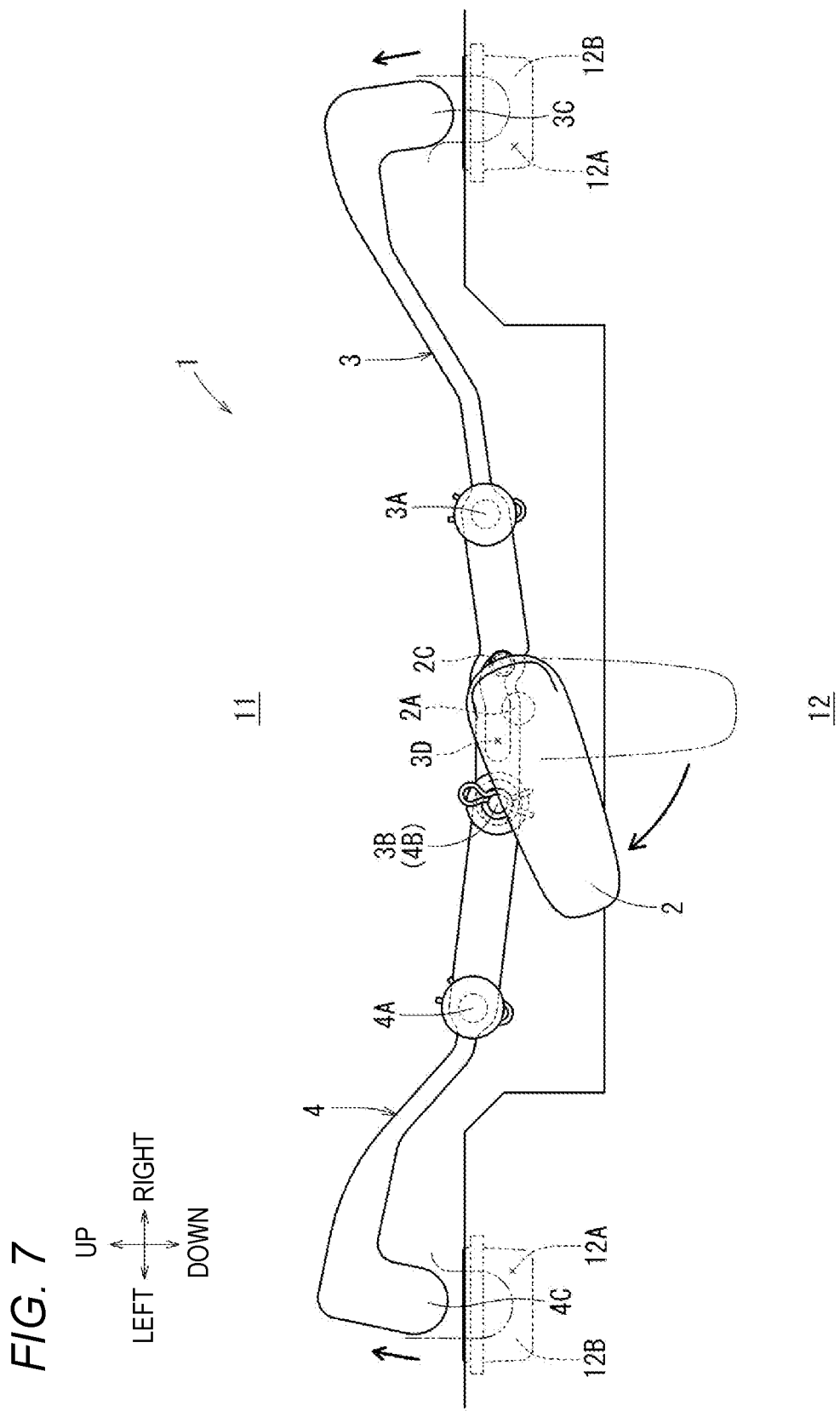
FIG. 7 is a schematic view illustrating a state in which the operation member is rotated leftward from the locked position.

As illustrated in FIG. 7, when the operation member 2 is rotated clockwise from the vertical orientation state to the left side in the drawing, the first long hole 3D of the first locking member 3 is also pushed downward in the drawing by the first pin 2C of the operation member 2. Accordingly, the first locking member 3 is rotated counterclockwise in the drawing about the first rotation shaft 3A. Therefore, due to the rotation, the first locking member 3 operates to pull up the locking claw 3C at the right end thereof in the drawing.

When the operation member 2 is returned from the state of being swung to the left side in the drawing shown in FIG. 7 to the vertical orientation state, the first locking member 3 is rotated clockwise in the drawing opposite to the above. Accordingly, the first locking member 3 operates to push down the locking claw 3C at the right end thereof in the drawing.

That is, when the operation member 2 is switched from a state of being switched to the left or the right orientation to the vertical orientation, the first locking member 3 pushes down the locking claw 3C and causes the locking claw 3C to enter the locking hole 12A in the upper surface portion on the right side of the seat back table 12 in the drawing from above. Further, when the operation member 2 is switched from the vertical orientation state to the left or the right orientation, the first locking member 3 pulls out the locking claw 3C upward from the locking hole 12A on the right side of the seat back table 12 in the drawing.

The first locking member 3 is configured such that a length from the first rotation shaft 3A, which is a rotation center of the first locking member 3, to the locking claw 3C is larger than a length from the first rotation shaft 3A to a left end of the first long hole 3D in the drawing that is a connection portion with the operation member 2. Accordingly, the first locking member 3 can largely move the locking claw 3C in the up-down direction relative to an amount of movement pushed by the first pin 2C due to the rotation operation of the operation member 2.

As illustrated in FIGS. 3 to 5, the intermediate portion of the second locking member 4 in the left-right direction in the drawing, which is the longitudinal direction of the second locking member 4, is rotatably connected to the frame (not illustrated) provided in the back portion of the seat back 11 by the second rotation shaft 4A having the axis directed in the front-rear direction. A second long hole 4B (see FIG. 5) through which the second pin 3B described above is inserted from a front side is formed at a right end of the second locking member 4 in the drawing. The second long hole 4B has a hole shape extending in the left-right direction in the drawing which is a longitudinal direction of the second locking member 4.

The second locking member 4 is formed with the locking claw 4C extending downward at a left end of the second locking member 4 in the drawing. Since the second pin 3B extending from the left end of the first locking member 3 passes through the second long hole 4B at the right end of the second locking member 4 in the drawing, the second locking member 4 is rotated about the second rotation shaft 4A in an opposite direction to the first locking member 3 in conjunction with the rotation of the first locking member 3.

Specifically, as illustrated in FIG. 6, the operation member 2 is rotated counterclockwise to be swung to the right side in the drawing from the vertical orientation state and the first locking member 3 is rotated in the same direction, whereby the second long hole 4B is pushed downward in the drawing by the second pin 3B of the first locking member 3. Accordingly, the second locking member 4 is rotated clockwise in the drawing about the second rotation shaft 4A. Due to this rotation, the second locking member 4 operates to pull up the locking claw 4C at the left side thereof in the drawing.

When the operation member 2 is returned from the state of being swung to the right side in the drawing shown in FIG. 6 to the vertical orientation state, the second locking member 4 is rotated counterclockwise in the drawing opposite to the above. Accordingly, the second locking member 4 operates to push down the locking claw 4C at the left end thereof in the drawing.

As illustrated in FIG. 7, when the operation member 2 is rotated clockwise from the vertical orientation state to the left side in the drawing, the second long hole 4B of the second locking member 4 is pushed downward in the drawing by the second pin 3B of the first locking member 3. Accordingly, the second locking member 4 is rotated clockwise in the drawing about the second rotation shaft 4A. Therefore, due to the rotation, the second locking member 4 operates to pull up the locking claw 4C at the left end thereof in the drawing.

When the operation member 2 is returned from the state of being swung to the left side in the drawing shown in FIG. 7 to the vertical orientation state, the second locking member 4 is rotated counterclockwise in the drawing opposite to the above. Accordingly, the second locking member 4 operates to push down the locking claw 4C at the left end thereof in the drawing.

That is, similarly to the first locking member 3, when the operation member 2 is switched from a state of being switched to the left or the right orientation to the vertical orientation, the second locking member 4 pushes down the locking claw 4C and causes the locking claw 4C to enter the locking hole 12A in the upper surface portion on the left side of the seat back table 12 in the drawing from above. Further, when the operation member 2 is switched from the vertical orientation state to the left or the right orientation, the second locking member 4 pulls out the locking claw 4C upward from the locking hole 12A on the left side of the seat back table 12 in the drawing.

The second locking member 4 is also configured such that a length from the second rotation shaft 4A, which is a rotation center of the second locking member 4, to the locking claw 4C is larger than a length from the second rotation shaft 4A to a right end of the second long hole 4B in the drawing that is a connection portion with the first locking member 3. Accordingly, the second locking member 4 can largely move the locking claw 4C in the up-down direction relative to an amount of movement pushed by the second pin 3B due to the rotation operation of the operation member 2.

As illustrated in FIG. 5, each locking hole 12A is configured such that a peripheral side surface of the locking hole 12A is reinforced by a resin container-shaped retainer 12B. The locking claws 3C and 4C that enter the locking holes 12A each have a shape in which an outer peripheral surface on a lower end side in the drawing, which is a distal end of the locking claw, is rounded into a convex curved surface shape that is convex downward. Accordingly, when the operation member 2 is switched to the vertical orientation when the seat back table 12 (see FIG. 1) is deployed and used, the rounded distal end portions of the locking claws 3C and 4C protrude downward from the back portion of the seat back 11.

The first locking member 3 and the second locking member 4 are guided in a state in which end-side regions, which are regions where the locking claws 3C and 4C are formed, are sandwiched from the front and rear sides by a guide plate (not illustrated) provided in the back portion of the seat back 11. With reference to FIG. 3, when the operation member 2 is rotated from the vertical orientation state (a locked state) to the left or the right orientation, the first locking member 3 and the second locking member 4 are removed upward from the locking holes 12A before the operation member 2 is removed from a rotation region in which the operation member 2 presses the seat back table 12 from behind.

With such a configuration, when the operation member 2 is removed from the rotation region in which the operation member 2 presses the seat back table 12 from behind, the first locking member 3 and the second locking member 4 can be removed from the locking holes 12A. Accordingly, it is possible to prevent an unexpected situation in which the seat back table 12 is still locked at the storage position even when the user performs an operation of disengaging the operation member 2 from the seat back table 12.

The second locking member 4 does not overlap the first pin 2C extending from the operation member 2 in the seat width direction, and is disposed in a region deviated to the left side in the drawing relative to the first pin 2C. That is, the second locking member 4 is not directly operated together with the first locking member 3 by the operation member 2 with the first pin 2C being inserted through the second long hole 4B, and is operated by the second pin 3B provided in the first locking member 3, that is, the second pin 3B provided in the region deviated to the left side in the drawing relative to the first pin 2C.

With such a configuration, a forward extension length of the first pin 2C can be reduced as compared with a configuration in which the first pin 2C passes through the first locking member 3 and the second locking member 4 and is connected to the first locking member 3 and the second locking member 4. As a result, the locking device 1 including the operation member 2 can be appropriately disposed even when a back rest surface of the seat back 11 is recessed and a disposition space is narrow at a center portion of the seat back 11 in the seat width direction disposed with the operation member 2.

To summarize the above, the locking device 1 according to the present embodiment may have the following configuration. In the following description, reference numerals assigned in parentheses correspond to the configurations described in the embodiment described above.

More specifically, the present disclosure relates to a locking device (1) for a seat back table that locks a seat back table (12) at a storage position at which the seat back table is stored along a back portion of a seat back (11). The locking device (1) for a seat back table includes a rotary operation member (2) provided on a main body member (11) that is one of the seat back table (12) and the seat back (11). The locking device (1) for a seat back table further includes a first locking member (3) provided on the main body member (11) and connected to the operation member (2) via a connection structure in which a first pin (2C) is slidable in a first long hole (3D) to be pushed and rotated in conjunction with rotation of the operation member (2).

The locking device (1) for a seat back table further includes a second locking member (4) provided on the main body member (11) and connected to the first locking member (3) via a connection structure in which a second pin (3B) is slidable in a second long hole (4B) to be pushed and rotated in a direction opposite to the first locking member (3) by the rotation of the operation member (2). When the operation member (2) is rotated in one direction from a predetermined position, the first locking member (3) and the second locking member (4) are rotated in directions opposite to each other and are engaged with a counterpart member (12) that is the other of the seat back table (12) and the seat back (11) to hold the seat back table (12) at the storage position.

According to the configuration described above, a configuration in which the first locking member (3) and the second locking member (4) are caused to perform the locking operation as the operation member (2) is rotated can be implemented by a simple configuration in which the first locking member and the second locking member are connected to each other via the connection structure in which the first pin (2C) is slidable in the first long hole (3D) and the connection structure in which the second pin (3B) is slidable in the second long hole (4B). The seat back table (12) can be appropriately locked at the storage position by the engagement of the first locking member (3) and the second locking member (4) with the counterpart member (12).

The operation member (2) is a latch configured to be engaged with the counterpart member (12) by the rotation in the one direction to hold the seat back table (12) at the storage position. According to the configuration described above, the seat back table (12) can also be locked at the storage position by the operation member (2) in addition to the first locking member (3) and the second locking member (4). Accordingly, the seat back table (12) can be locked at the storage position more appropriately.

When the operation member (2) is rotated in the other direction from an engagement position with the counterpart member (12), the first locking member (3) and the second locking member (4) are disengaged from the counterpart member (12) before the operation member (2) is disengaged from the counterpart member. According to the configuration described above, when the operation member (2) is disengaged from the counterpart member (12) by rotating the operation member (2) in a releasing direction, the first locking member (3) and the second locking member (4) can be disengaged from the counterpart member (12). Therefore, it is possible to prevent an unexpected situation in which the seat back table (12) is still locked at the storage position even when the user performs an operation of disengaging the operation member (2) from the counterpart member (12).

The main body member (11) is the seat back (11), and the counterpart member (12) is the seat back table (12). The operation member (2) includes a recessed hook (2B) on which a small article can be hooked on an upper surface of the hook. According to the configuration described above, the operation member (2) can be used as a hooking tool such as a coat hook not only when the seat back table (12) is stored but also when the seat back table is deployed.

The first locking member (3) and the second locking member (4) each include a locking claw (3C and 4C) configured to be engaged with the seat back table (12) by entering a locking hole (12A) formed in an upper surface of the seat back table (12) flipped to the storage position. According to the configuration described above, the locking claws (3C and 4C) of the first locking member (3) and the second locking member (4) can be engaged with the seat back table (12) without being exposed to the outside.

The operation member (2) is provided at a position corresponding to an intermediate portion in a width direction of the seat back table (12) flipped to the storage position. The first locking member (3) and the second locking member (4) are provided with a first rotation shaft (3A) and a second rotation shaft (4A), respectively, that are rotation centers of the first locking member and the second locking member and are separated into a position on one side and a position on the other side in the width direction sandwiching an operation rotation shaft (2A) that is a rotation center of the operation member (2). The second locking member (4) is connected to the first locking member (3) at a position between the operation rotation shaft (2A) and the second rotation shaft (4A).

According to the configuration described above, it is possible to prevent the members from being disposed in a bulky manner in a disposition region of the operation member (2) as compared with a case in which the second locking member (4) is connected to the operation member (2) together with the first locking member (3). As a result, it is possible to appropriately provide the locking device (1) for a seat back table even when a back rest surface of the seat back (11) is recessed and a disposition space is narrow, such as when the operation member (2) is disposed at a center of the seat back in the width direction.

The operation member (2) is provided at a position corresponding to an intermediate portion in a width direction of the seat back table (12) flipped to the storage position. The first locking member (3) and the second locking member (4) are provided with a first rotation shaft (3A) and a second rotation shaft (4A), respectively, that are rotation centers of the first locking member and the second locking member and are separated into a position on one side and a position on the other side in the width direction sandwiching an operation rotation shaft (2A) that is a rotation center of the operation member (2), and the operation member (2) is rotated such that the first locking member (3) and the second locking member (4) are disengaged from the counterpart member (12) regardless of a direction in which the operation member (2) is rotated from a locked position at which the first locking member (3) and the second locking member (4) are engaged with the counterpart member (12).

According to the configuration described above, the first locking member (3) and the second locking member (4) can be disengaged from the counterpart member (12) regardless of the direction in which the operation member (2) is rotated from the locked position. Therefore, convenience of the locking device (1) for a seat back table can be further improved.

Second Embodiment

Figure 8:
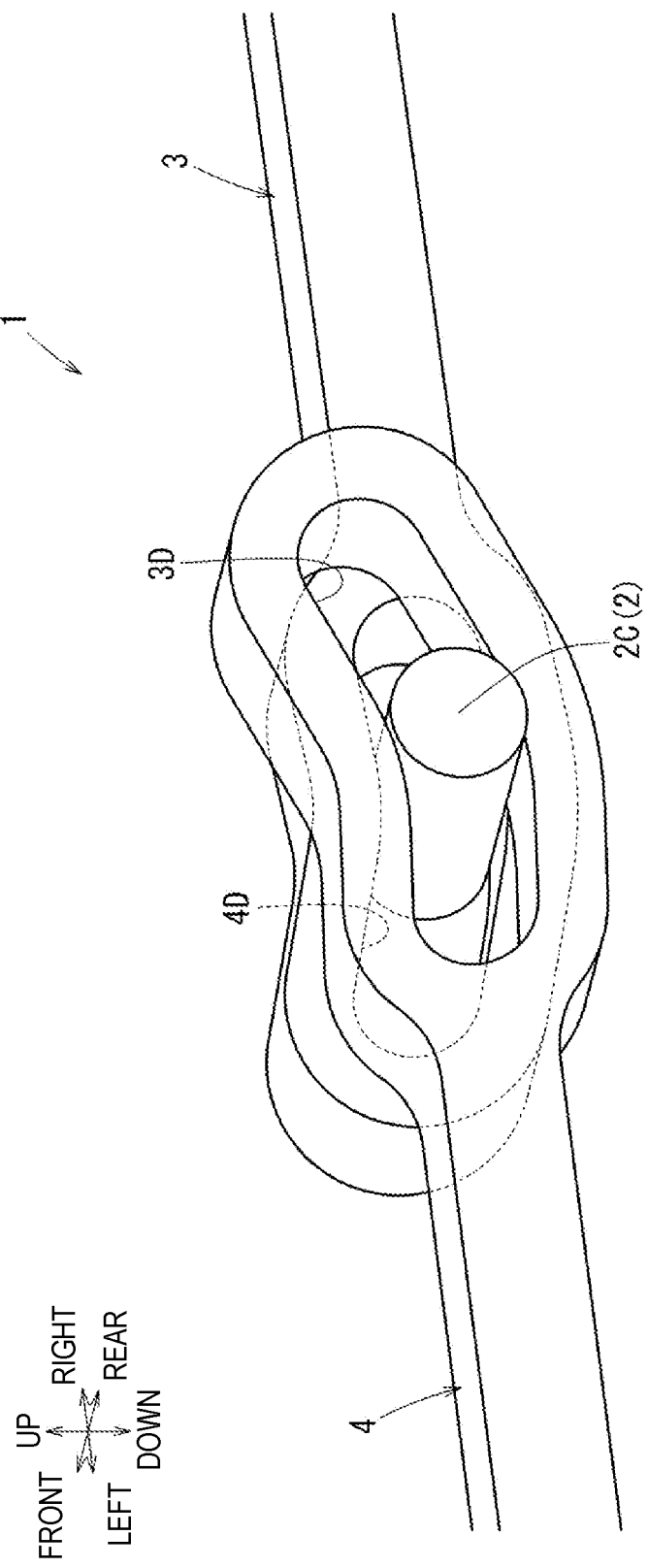
FIG. 8 is a partially enlarged perspective view illustrating main portions of a locking device for a seat back table according to a second embodiment.

Next, a configuration of a locking device for a seat back table (hereinafter, referred to as a locking device) 1 according to a second embodiment will be described with reference to FIG. 8. The locking device 1 according to the present embodiment is configured such that the first pin 2C extending forward from the operation member 2 passes through the second locking member 4 together with the first locking member 3 and the second locking member 4 is rotated by the first pin 2C.

Specifically, a second long hole 4D through which the first pin 2C passes from a front side is formed at a right end of the second locking member 4 in the drawing. The second long hole 4D has a hole shape extending in a left-right direction in the drawing which is a longitudinal direction of the second locking member 4. Also, with such a configuration, similarly to the configuration disclosed in the first embodiment, the second locking member 4 can be operated to rotate in a direction opposite to a rotation direction of the first locking member 3 as the operation member 2 is rotated.

That is, the first pin 2C according to the present embodiment is inserted through the first long hole 3D of the first locking member 3, and also has a function of a "second pin" according to the present disclosure that passes through the second long hole 4D of the second locking member 4. Since configurations other than the above are the same as the configuration disclosed in the first embodiment, the same reference numerals are given and the description thereof is omitted.

To summarize the above, the locking device 1 according to the present embodiment may have the following configuration. In the following description, reference numerals assigned in parentheses correspond to the configurations described in the embodiment described above.

More specifically, the present disclosure relates to a locking device (1) for a seat back table that locks a seat back table (12) at a storage position at which the seat back table is stored along a back portion of a seat back (11). The locking device (1) for a seat back table includes a rotary operation member (2) provided on a main body member (11) that is one of the seat back table (12) and the seat back (11). The locking device (1) for a seat back table further includes a first locking member (3) provided on the main body member (11) and connected to the operation member (2) via a connection structure in which a first pin (2C) is slidable in a first long hole (3D) to be pushed and rotated in conjunction with rotation of the operation member (2).

The locking device (1) for a seat back table further includes a second locking member (4) configured to be provided on the main body member (11) and connected to the operation member (2) via a connection structure in which a second pin (2C) is slidable in a second long hole (4D) to be pushed and rotated in a direction opposite to the first locking member (3) by the rotation of the operation member (2). When the operation member (2) is rotated in one direction from a predetermined position, the first locking member (3) and the second locking member (4) are rotated in directions opposite to each other and are engaged with a counterpart member (12) that is the other of the seat back table (12) and the seat back (11) to hold the seat back table (12) at the storage position.

According to the configuration described above, a configuration in which the first locking member (3) and the second locking member (4) are caused to perform the locking operation as the operation member (2) is rotated can be implemented by a simple configuration in which the first locking member and the second locking member are connected to each other via the connection structure in which the first pin (2C) is slidable in the first long hole (3D) and the connection structure in which the second pin (2C) is slidable in the second long hole (4D). The seat back table (12) can be appropriately locked at the storage position by the engagement of the first locking member (3) and the second locking member (4) with the counterpart member (12).

Regarding Other Embodiments

The embodiments according to the present disclosure have been described with reference to the two embodiments, and the present disclosure can be implemented in various forms other than the above embodiments.

1. The locking device for a seat back table according to the present disclosure may be applied to a seat of a vehicle such as an automobile or a railway, in addition to a seat of an aircraft. Further, the locking device for a seat back table may be applied to an aircraft such as a ship or a vehicle other than the vehicle. The locking device for a seat back table may be applied to seats provided in various facilities such as a movie theater, a theater, a concert hall, and a sports facility in addition to the vehicle.
2. The locking device for a seat back table may be provided in a seat back table other than the seat back (the "main body member" may be the seat back table). In this case, the "counterpart member" with which the first locking member and the second locking member are engaged is the seat back. Even with such a configuration, the seat back table can be locked at a position at which the seat back table is stored with respect to the seat back.

3. The operation member may have a function as a latch that is engaged with the counterpart member to hold the seat back table at the storage position by the rotation thereof, and may be provided only for a purpose of rotating the first locking member and the second locking member. In this case, the operation member may be formed as a round handle.

4. The recessed hook formed in the operation member may be formed in the upper surface of the operation member when the operation member is oriented in any direction. That is, taking the configurations disclosed in the embodiments described above as examples, the hook may be formed on an upper surface of the operation member when the operation member is in the horizontal orientation, or may be formed on the upper surface in both the vertical orientation and the horizontal orientation.

5. When the locking device for a seat back table is provided in the seat back, similarly to the operation member, the locking claw of the first locking member and/or the locking claw of the second locking member may project from the seat back to press the seat back table from behind. The locking claws may extend seamlessly from the first locking member and the second locking member, or may be formed of separate members attached to the first locking member and the second locking member.

What is claimed is:

1. A locking device for a seat back table for locking the seat back table stored at a storage position at which the seat back table is stored along a back portion of a seat back, the locking device comprising:
   a rotary operation member configured to be provided on a main body member that is one of the seat back table and the seat back;
   a first locking member configured to be provided on the main body member and connected to the rotary operation member via a connection structure in which a first pin is slidable in a first long hole to be pushed and rotated in conjunction with rotation of the rotary operation member; and
   a second locking member configured to be provided on the main body member and connected to the rotary operation member or the first locking member via a connection structure in which a second pin is slidable in a second long hole to be pushed and rotated in a direction opposite to the first locking member by the rotation of the rotary operation member, wherein
   when the rotary operation member is rotated in one direction from a predetermined position, the first locking member and the second locking member are rotated in directions opposite to each other and are engaged with a counterpart member that is the other of the seat back table and the seat back to hold the seat back table at the storage position.

2. The locking device for a seat back table according to claim 1, wherein
   the rotary operation member is a latch configured to be engaged with the counterpart member by the rotation in the one direction to hold the seat back table at the storage position.

3. The locking device for a seat back table according to claim 2, wherein
   when the rotary operation member rotated in the other direction from an engagement position with the counterpart member, the first locking member and the second locking member are disengaged from the counterpart member before the rotary operation member is disengaged from the counterpart member.

4. The locking device for a seat back table according to claim 1, wherein
   the main body member is the seat back, the counterpart member is the seat back table, and the rotary operation member includes a recessed hook on which a small article can be hooked on an upper surface of the hook.

5. The locking device for a seat back table according to claim 4, wherein
   the first locking member and the second locking member each include a locking claw configured to be engaged with the seat back table by entering a locking hole formed in an upper surface of the seat back table flipped to the storage position.

6. The locking device for a seat back table according to claim 1, wherein
   the rotary operation member is provided at a position corresponding to an intermediate portion in a width direction of the seat back table flipped to the storage position,
   the first locking member and the second locking member are provided with a first rotation shaft and a second rotation shaft, respectively, that are rotation centers of the first locking member and the second locking member and are separated into a position on one side and a position on the other side in the width direction sandwiching an operation rotation shaft that is a rotation center of the rotary operation member, and
   the second locking member is connected to the first locking member at a position between the operation rotation shaft and the second rotation shaft.

7. The locking device for a seat back table according to claim 1, wherein
   the rotary operation member is provided at a position corresponding to an intermediate portion in a width direction of the seat back table flipped to the storage position,
   the first locking member and the second locking member are provided with a first rotation shaft and a second rotation shaft, respectively, that are rotation centers of the first locking member and the second locking member and are separated into a position on one side and a position on the other side in the width direction sandwiching an operation rotation shaft that is a rotation center of the rotary operation member, and
   the rotary operation member is rotated such that the first locking member and the second locking member are disengaged from the counterpart member regardless of a direction in which the rotary operation member is rotated from a locked position at which the first locking member and the second locking member are engaged with the counterpart member.

* * * * *